Figure 1:
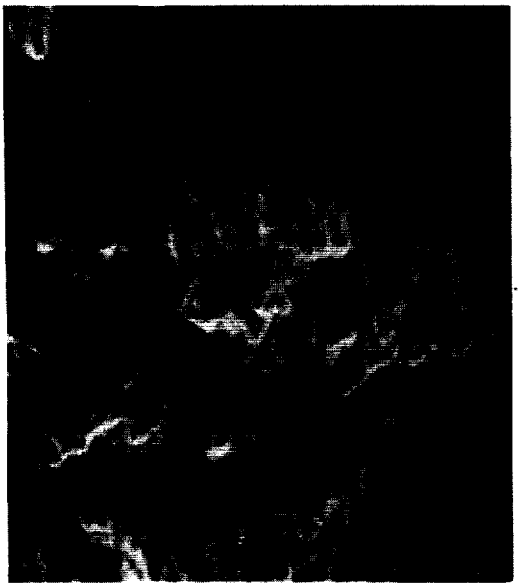

United States Patent [19]
Fein et al.

[11] 3,935,128

[45] Jan. 27, 1976

[54] COPPER CHROMITE CATALYST AND THE PROCESS FOR PRODUCING IT

[75] Inventors: Marvin Michael Fein, Westfield, N.J.; Paul Alexander Colgate, Los Angeles, Calif.; Ronald Allan Kent, Ridgewood, N.J.

[73] Assignee: Dart Industries Inc., Los Angeles, Calif.

[22] Filed: Dec. 30, 1974

[21] Appl. No.: 537,793

[52] U.S. Cl. ............................... 252/467; 423/595
[51] Int. Cl.² ......................................... B01J 23/86
[58] Field of Search ..................... 252/467; 423/595

[56] References Cited
UNITED STATES PATENTS 2,089,433  8/1937  Salzberg ........................ 252/467 X

*Primary Examiner*—W. J. Shine
*Attorney, Agent, or Firm*—Fred S. Valles; Margareta LeMaire

[57] ABSTRACT

An improved copper chromite catalyst having high density, low monovalent ion content, high activity and resistance to poisoning is prepared by reacting a soluble copper salt with chromic acid or a dichromate in solution in the presence of ammonia and urea to precipitate a copper-chromium-nitrogen complex, washing, drying and calcining the precipitate.

17 Claims, 2 Drawing Figures

COPPER CHROMITE CATALYST AND THE PROCESS FOR PRODUCING IT

Copper chromite or Adkin's catalyst has been a useful synthetic tool since its disclosure in 1931. The organic chemical industry has produced millions of pounds of hydrogenated and dehydrogenated esters and alcohols by processes employing this catalyst. Despite a long history of use, relatively little is known of its fundamental catalytic mode or even of its true chemical structure. It is well acccepted that even the name is a misnomer and that the actual catalyst contains no crystalline copper chromite. Copper chromite catalysts are commonly prepared by reacting a mixture of a water soluble copper salt and an alkali dichromate with ammonium hydroxide, separating the precipitated copper-chromium-nitrogen complex thus formed, washing and calcining the precipitate.

Catalysts employed in commercial processes are expected to give high conversions of materials per unit of catalyst. It is also desirable to have catalysts that are resistant to process upsets and which can tolerate impure feedstocks for prolonged periods. To this end modifications of the original catalyst with varying chromium ratios and with additional elements present have been developed. Primarily barium and other divalent ions incorporated in the catalyst have been utilized to achieve resistance to reduction of the active catalytic sites. It has been found that sodium ions and other monovalent ions will severely lower catalyst activity.

Active sites must be accessible to reacting molecules for catalysis to occur. A porosity and surface area appropriate to the synthetic environment must therefore be provided for a commercial catalyst. For this reason, extremes of high or low specific surface area are not desirable.

A further requirement for efficient catalyst use is its ease of removal from the reaction mixture. Although some of this catalyst is employed in compacted forms, slurries of the catalyst are more common. As centrifugation is a useful way of continuously removing catalyst from organic liquids, a dense form of the catalyst, meeting the previous criteria is particularly desirable.

Prior commercial catalysts, and those described in the literature show varying degrees of success in achieving these goals, and in general these prior art materials have been characterized by high sodium ion contents and low bulk density.

We have now found that through the employment of urea as a novel processing aid, a catalyst of unique structure can be produced which possesses the characteristics of high density, low monovalent ion content and unusual resistance to poisoning by impurities. It also has large particles easily washed free of the reaction products to improve yields while possessing ample surface for catalytic reactions.

Figure 2:

FIG. 1 is a microphotograph of copper chromite catalysts prepared in accordance with a prior art method and FIG. 2 is a microphotograph of the catalyst of the invention.

In accordance with the present invention, there is provided an improved copper chromite catalyst which is prepared by the process which comprises reacting a mixture of a soluble copper salt and a chromium compound taken from the group selected from chromic acid or an alkali chromate or dichromate, with ammonia and between about 0.5 and about 5 percent urea based on the weight of the copper, calculated as the metal, separating the copper-chromium-nitrogen complex thus formed as a precipitate from the reaction mixture, washing the precipitate and then calcining the precipitate.

The soluble copper salt can be sulfate, chloride, nitrate, phosphate, carbonate or an acetate. The preferred copper salts are those of nitric acid. The copper salt is used as a solution which is prepared either by dissolving the salt in a polar solvent such as water or by dissolving metallic copper in the appropriate acid. Similarly, the chromium compound is employed as a solution in the reaction. The chromate or dichromate can be sodium dichromate, potassium dichromate, ammonium dichromate, sodium chromate, lithium chromate, etc. The relative proportions of copper salt and chromium compound should be selected such that the atomic ratio of copper to chromium ranges between about 0.8 to about 2.5 and preferably between about 1.0 to about 1.5.

The ammonia can be provided to the reaction either in gaseous form or as aqueous ammonia or both. The actual quantity of ammonia used varies from system to system depending upon such factors as whether the anion of the copper salt is from a weak or strong acid in the copper salt solution, whether chromic acid or alkaline chromate or dichromate was used, etc. For this reason no specific proportions can be set that are meaningful, however, the total amount of ammonia used should be sufficient to result in maintaining a final pH after addition of all reactants at a value ranging between about 5 and about 10, and preferably a pH between about 5.5 and about 7 is maintained to assure maximum recovery of the precipitate.

The urea is added to the reaction usually in solid form. However, it is also within the scope of the invention to add it as a solution e.g. dissolved in water or in aqueous ammonia.

The amount of polar solvent used (hereinafter referred to as water), should be sufficient to provide a final solids concentration in the slurry resulting from the reaction of between about 1 to about 20 percent by weight, preferably between about 5 and about 15 percent by weight. In order to avoid contamination from dissolved impurities in the water, it is preferred to use deionized water in the reaction.

The catalyst is prepared by adding the ammonia and the urea to the solution of either the chromium compound or the copper salt. As mentioned above, the ammonia can be added in aqueous form, e.g. 28–30% by weight $NH_3$ in water or it can be bubbled or sparged into the solution of the chromium or copper compound. Subsequently, the other solution containing then either the copper salt or the chromium compound is added on an intermittent or continuous basis. The reaction mixture is then allowed to digest for at least another 20 minutes, preferably for at least one hour in order to provide a slow crystal growth which is necessary to avoid entrapment of reactants and reaction products within the crystal structure and to enable sufficient time for the development of the large crystals, which are uniquely formed by this process. The temperature employed is not critical and may be varied over a wide range, e.g. from about 40°C to the boiling point of the polar solvent. Usually the temperature is maintained in the region from about 60°C to about 90°C.

After the digestion is completed, the precipitated solids are recovered from the slurry by a conventional means such as by filtration or centrifugation. The solids are then washed free of reaction products in one or more washing steps, suitably employing deionized water, at least as the final washing medium. Preferably the solids are washed by reslurrying the solids in the water with agitation. The solids can then be dried, if desired, and are subsequently calcined at a temperature of about 200°C to about 1000°C or higher and suitably from about 300°C to about 475°C. In the calcination nitrogen and water are released from the copper-chromium-nitrogen complex and the desired active copper chromite catalyst is produced.

Depending upon its subsequent process use, the catalyst may or may not be pulverized and/or classified. In many reactions, especially those carried out with the catalyst slurried in the reaction mixture, it is preferred to use the catalyst without comminutation because of the superior separation characteristics of the large particle catalyst.

The catalyst of this invention is useful in any of the processes employing copper chromite catalyst, such as in various hydrogenation, dehydrogenation and oxidation reactions. Specific examples of reactions catalyzed by copper chromite include conversion of esters of organic acids to the corresponding alcohols, reduction of diesters to glycols, oxidation of carbon monoxide to carbon dioxide in automotive exhausts, reduction of nitrogen oxides to nitrogen with carbon monoxide or hydrocarbons, etc.

If desired, any of the various additives and promoters for copper chromite catalysts may be incorporated into the catalyst of the present invention by any of the well known techniques therefor, e.g. by impregnation, co-precipitation, etc. Such additives and promoters include zinc, barium, manganese or calcium compounds, which upon calcination of the catalysts are converted to oxidic form.

It is not known what the exact function the urea serves in the reaction producing the copper-chromium-nitrogen complex. One may postulate that is prevents the formation of nitroso complexes of copper and enhances the regularity of the desired amine complex. The latter in turn enables formation of uniform crystals without co-precipitation or entrapment of undesirable salts. Whatever the reason may be, incorporation of small amounts of urea into the reaction causes a dramatic increase in crystal size of the calcined catalysts which is demonstrated by a comparison of FIG. 1 (microphotograph of a prior art catalyst at X30,000 magnification) and FIG. 2 (catalyst of the invention at X30,000 magnification). The catalysts exhibits a much superior activity as compared to catalysts prepared by prior art techniques. Also the preparation and handling of the catalysts of the invention are considerably easier and more efficient than those of the prior art catalysts, in that due to the higher densities of the complex as well as the final catalysts, any solids-liquid separation involving these materials, such as by filtration, centrifugation is both more rapid and more complete.

The following examples are illustrative of the invention and are not intended to limit the scope thereof.

EXAMPLE 1

A copper chromite catalyst was prepared according to the prior art technique as set forth below. 900cc of a solution containing 260 grams of copper nitrate trihydrate in deionized water was heated to 80°C and added with stirring into 900cc of a solution at 25°C containing 178 grams of sodium dichromate dihydrate and 225cc of 28% ammonium hydroxide in deionized water resulting in the formation of a precipitate. The reaction mixture which had a pH of 6.4 was digested for 45 minutes under agitation after which it was filtered, washed twice on the filter with 100cc portions of deionized water, dried at 110°C overnight and calcined at 360°C for 45 minutes. The resulting catalyst was analyzed for sodium content by atomic absorption. The average crystal size was determined by scanning electron microscopy, and the surface area by B.E.T. nitrogen surface area determinations. The activity of the catalyst was evaluated by measuring the speed of reduction of methyl laurate with hydrogen at 3000 psig and 260°C. The products of this reaction are methyl alcohol and dodecyl alcohol. A slurry of 5.0 grams of the catalyst was made in 100cc of methyl alcohol and added to 450 grams of methyl laurate in a one liter 4 ⅜inches standard autoclave vessel, which was subsequently pressurized with hydrogen to 3000 psig and heated to 260°C. 90 minutes after the temperature and pressure had been established, the reaction was discontinued and the reaction mixture was analyzed to determine the amount of residual methyl laurate present in the reaction mixture by standard saponification and titration techniques. It was found that 65% of the methyl laurate had actually been converted. For the purpose of enabling comparison with the catalysts prepared in subsequent experiments, the activity of the catalyst corresponding to the observed conversion of 65% was arbitrarily set at 100%.

The pertinent data obtained in the aforementioned analyses and determinations are presented in Table I.

EXAMPLE 2

The catalyst of this Example was prepared in the same manner as that of the previous example except that 0.6 grams of urea was also added to the ammoniacal solution of sodium dichromate, the urea addition corresponding to 1 percent by weight of copper calculated as the metal. The results of the tests performed on the catalyst are reported in Table I.

EXAMPLES 3–4

Examples 3 and 4 were carried out respectively as Examples 1 and 2 except that after filtration, each of the precipitates were slurried five times with agitation in 100cc portions of deionized water, rather than being washed twice on the filter. The washing technique had a beneficial effect on activities and sodium contents of the catalysts, and it appeared that the improvement had due to the addition of urea was even more pronounced when the catalyst had been washed repeatedly by reslurrying it in water. The data are presented in Table I.

TABLE I

| Example | Urea wt.% basis | pH | Size Microns | Activity-% | Na ppm | Surface Area m²/g |
|---|---|---|---|---|---|---|
| 1 | 0 | 6.4 | 0.7 | 100 | 25 | 48 |
| 2 | 1 | 6.3 | 2.8 | 100 | 50 | 50 |
| 3 | 0 | 6.6 | 0.6 | 106 | 50 | 42 |
| 4 | 1 | 6.5 | 3.2 | 121 | 75 | 45 |

What is claimed is:

1. In a process for the production of copper chromite catalyst wherein a water soluble copper salt is reacted in solution with a chromium compound selected from the group consisting of chromic acid, an alkali chromate and an alkali dichromate in the presence of ammonia to form a precipitate of a copper-chromium-nitrogen complex, the precipitate is recovered from the reaction mixture, washed, dried and calcined, the improvement which comprises, adding between about 0.5 and about 5 percent by weight of urea based on the copper calculated as the metal to the solution prior to precipitation.

2. The process of claim 1 wherein the proportions of copper salt and chromium compound are selected to provide a copper to chromium atomic ratio in the range between about 0.8:1 and about 2.5:1.

3. The process of claim 1 wherein the soluble copper salt is selected from the group consisting of copper sulfate, copper chloride, copper nitrate, copper phosphate, copper carbonate and copper acetate.

4. The process of claim 1 wherein the copper salt is a copper nitrate.

5. The process of claim 1 wherein the chromium compound is an alkali dichromate selected from the group consisting of sodium dichromate, potassium dichromate and ammonium dichromate.

6. The process of claim 1 wherein the chromium compound is sodium dichromate.

7. The process of claim 1 wherein the proportions of copper salt and chromium compound are selected to provide a copper to chromium atomic ratio in the range between about 1:1 and about 1.5:1.

8. The process of claim 1 wherein the temperature of the reaction mixture is maintained between about 60°C and about 90°C.

9. The process of claim 1 wherein prior to recovery of the precipitate the reaction mixture is digested for at least 20 minutes.

10. The process of claim 1 wherein the reaction is carried out in the presence of sufficient amount of ammonia to maintain the reaction mixture in a pH range from about 5 to about 10.

11. The process of claim 1 wherein the precipitate is washed in more than one step by reslurrying it under agitation in deionized water.

12. The process of claim 10 wherein the pH is maintained between about 5.5 and about 7.

13. An improved copper chromite catalyst composition prepared by washing, drying and calcining the copper-chromium-nitrogen complex obtained in the process which comprises reacting in solution and in the presence of ammonia a. a water-soluble copper salt selected from the group consisting of copper sulfate, copper chloride, copper nitrate, copper phosphate, copper carbonate and copper acetate;

b. a chromium compound selected from the group consisting of chromic acid, alkali chromate and alkali dichromate in an amount to provide a copper to chromium atomic ratio in the range between about 0.8:1 and about 2.5:1.

c. from about 0.5 to about 5 percent by weight urea based on the copper calculated as the metal.

14. The improved catalyst of claim 13 wherein the copper salt is copper nitrate.

15. The improved catalyst of claim 13 wherein the chromium compound is alkali dichromate selected from the group consisting of sodium dichromate, potassium dichromate and ammonium dichromate.

16. The improved catalyst of claim 13 wherein the chromium compound is sodium dichromate.

17. The improved catalyst of claim 13 wherein the proportions of copper salt and chromium compound are selected to provide a copper to chromium atomic ratio in the range between about 1:1 and about 1.5:1.

* * * * *

UNITED STATES PATENT OFFICE
CERTIFICATE OF CORRECTION

PATENT NO. : 3,935,128
DATED : January 27, 1976
INVENTOR(S) : Marvin M. Fein, Paul A. Colgate, Ronald A. Kent It is certified that error appears in the above-identified patent and that said Letters Patent are hereby corrected as shown below:

In TABLE I, Column 4, lines 59 - 67, the column of the TABLE now headed by "Na" should read as follows:

| Na ppm |
|--------|
| 525 |
| 150 |
| 450 |
| 75 |

Signed and Sealed this twentieth Day of April 1976

[SEAL]

Attest:

RUTH C. MASON
*Attesting Officer*

C. MARSHALL DANN
*Commissioner of Patents and Trademarks*